June 11, 1963  H. L. McFEATERS ETAL  3,093,253
SCRAP CHARGING
Filed Aug. 16, 1960  7 Sheets-Sheet 1

INVENTORS.
Harry L. McFeaters
Ira W. Lakin
BY
Green, McCallister & Miller
THEIR ATTORNEYS

June 11, 1963  H. L. McFEATERS ETAL  3,093,253
SCRAP CHARGING

Filed Aug. 16, 1960  7 Sheets-Sheet 4

Fig. 5

INVENTORS.
Harry L. McFeaters
Ira W. Lakin
BY
Green, McCallister & Miller
THEIR ATTORNEYS

Fig. 6

INVENTORS.
Harry L. McFeaters
Ira W. Lakin
BY
Green, McCallister & Miller
THEIR ATTORNEYS

INVENTORS.
Harry L. McFeaters
Ira W. Lakin

June 11, 1963  H. L. McFEATERS ETAL  3,093,253
SCRAP CHARGING
Filed Aug. 16, 1960  7 Sheets-Sheet 7

INVENTORS.
Harry L. McFeaters
Ira W. Lakin
BY
Green, McCallister, & Miller
THEIR ATTORNEYS United States Patent Office 3,093,253
Patented June 11, 1963

3,093,253
SCRAP CHARGING
Harry L. McFeaters, New Castle, and Ira W. Lakin, Volant, Pa., assignors to Pennsylvania Engineering Corporation, New Castle, Pa., a corporation of Pennsylvania
Filed Aug. 16, 1960, Ser. No. 49,996
17 Claims. (Cl. 214—18)

This invention relates to a plant layout or operating assembly for melting or refining furnace vessels and particularly, to an operative layout and apparatus for facilitating the charging of a furnace vessel.

One phase of the invention pertains to new and improved apparatus for quickly and efficiently, periodically charging an open-mouth furnace vessel with scrap material, such as a trunnion-mounted, tiltable, oxygen-blow vessel and particularly, in a coordinated manner, without interfering with other operations of the vessel, such as the charging of it with molten metal, its refining-blowing operation, and the pouring of refined metal as well as its slag content.

This application is a continuation-in-part of our application Serial No. 856,475, filed December 1, 1959, and entitled "Furnace Scrap Charging," now abandoned.

In carrying out our invention, we have provided a relatively simple and coordinated plant layout and operating assembly which is economical of plant space and head room and which facilitates the various operations involved in utilizing a tiltable furnace vessel. We provide means for collecting scrap material on a floor or lower level of the plant, both from the standpoint of in-plant and out-plant supply sources, so that the material is always ready and available for use, as needed. At the collecting area or station, means is provided for storing the scrap material, for moving the scrap material into individual, relatively large scrap boxes while weighing them and allowing for tare, so that the boxes are made ready in the requisite quantities for subsequent furnace-charging operations. Weighed boxes containing desired quantities of the scrap material are stored as a group in readiness at such area.

Means is provided for lifting or raising each filled or charge-containing, ready scrap box to an overhead position and for lowering it into a carrying position within a cradle of a self-propelled overhead charging machine. The charging machine is constructed to move longitudinally of the layout on an overhead runway which extends above and beyond opposite sides of one of more furnace vessels. The charging machine is adapted to move on its runway into and out of an aligned or charging position with respect to the open mouth portion of a furnace and in such a manner as to not interfere with its fume-receiving hood, molten metal charging means, etc. The charging machine is provided with a filled box of scrap in readiness for a charging operation and a group of such machines may be used on the same runway or track in an independent or coordinated manner to meet scrap requirements of the furnace installation.

Each scrap-charging machine, not only has a means for propelling it to an overhead aligned position with respect to a furnace vessel, but also has cradle means for tilting the scrap box at a charging position to charge a vessel. When the box has been emptied, it and its cradle are raised back to a substantial horizontal position. The machine is then adapted to be moved to a side position from which its empty box may be removed and returned by the lifting means to the scrap-collecting area for reuse, and the lifting means may then be employed to lift and position a second filled box on the machine in readiness for another charging operation.

In accordance with our invention, the full scrap requirements of a given furnace vessel may be charged by a single scrap box, even where they may be in the neighborhood of up to about 50% of the charge and the vessel is of a large capacity type, e.g., in the neighborhood of 50 or 100 tons. If desirable, two or more scrap-charging machines may be employed for the full requirements of a given vessel. But in any event, the apparatus is so constructed and employed that a maximum, accurately-measured quantity of scrap material is always available for immediately charging a furnace, and there is no time delay in waiting for the scrap to be weighed and raised to an upper position for charging purposes.

It has been an object of our invention to devise a new and improved operating layout and apparatus assembly for meeting the requirements of an open mouth furnace vessel and particularly, one of a tiltable type, and essentially from the standpoint of its scrap charging;

Another object of our invention has been to devise a scrap handling layout in which measured quantities of scrap material are made available for lifting into position and measured quantities are maintained in a lifted position in readiness for immediate charging, as needed;

Another object of our invention has been to devise a scrap charging machine for positioning a scrap charging box in an overhead position in readiness for use, for moving it to a charging position, and for, at a charging position, discharging its full scrap content into the open mouth of a furnace vessel;

A further object of our invention has been to devise a new and improved charging machine and scrap box assembly for charging scrap materials which is self-propelled and is moved in an overhead relationship along the plant;

These and other objects of our invention will appear to those skilled in the art from the drawings, the description and the claims.

Figure 1:
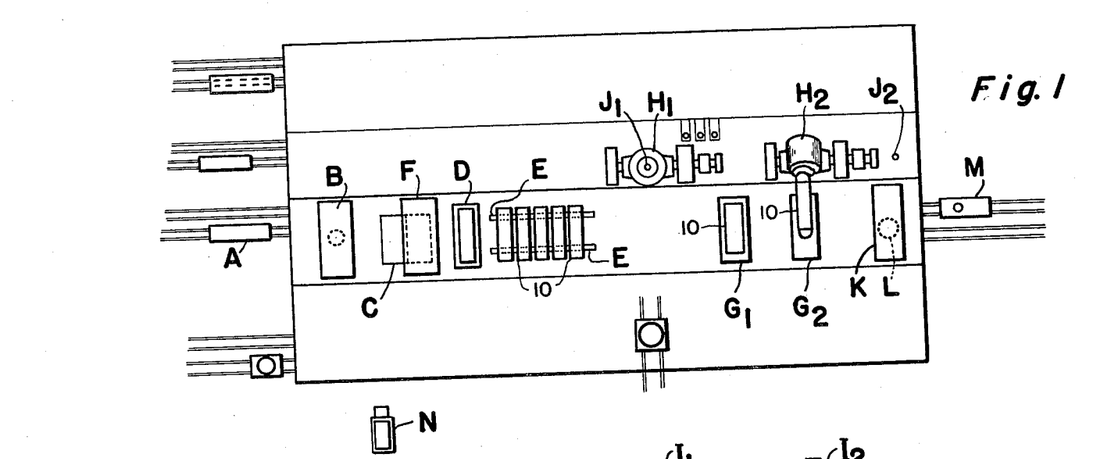
FIGURE 1 is a greatly reduced plan view of a plant layout employing our invention.
Figure 2:
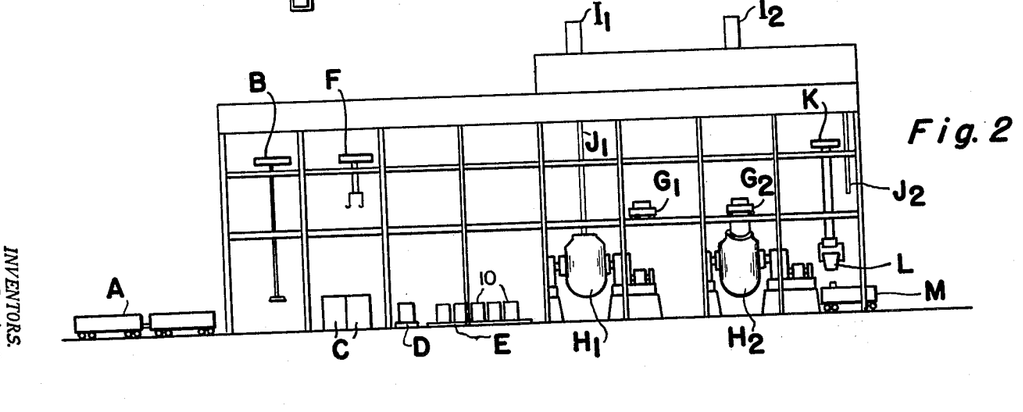
FIGURE 2 is a side view in elevation on the scale of FIGURE 1 of the layout of FIGURE 1.
Figure 3:
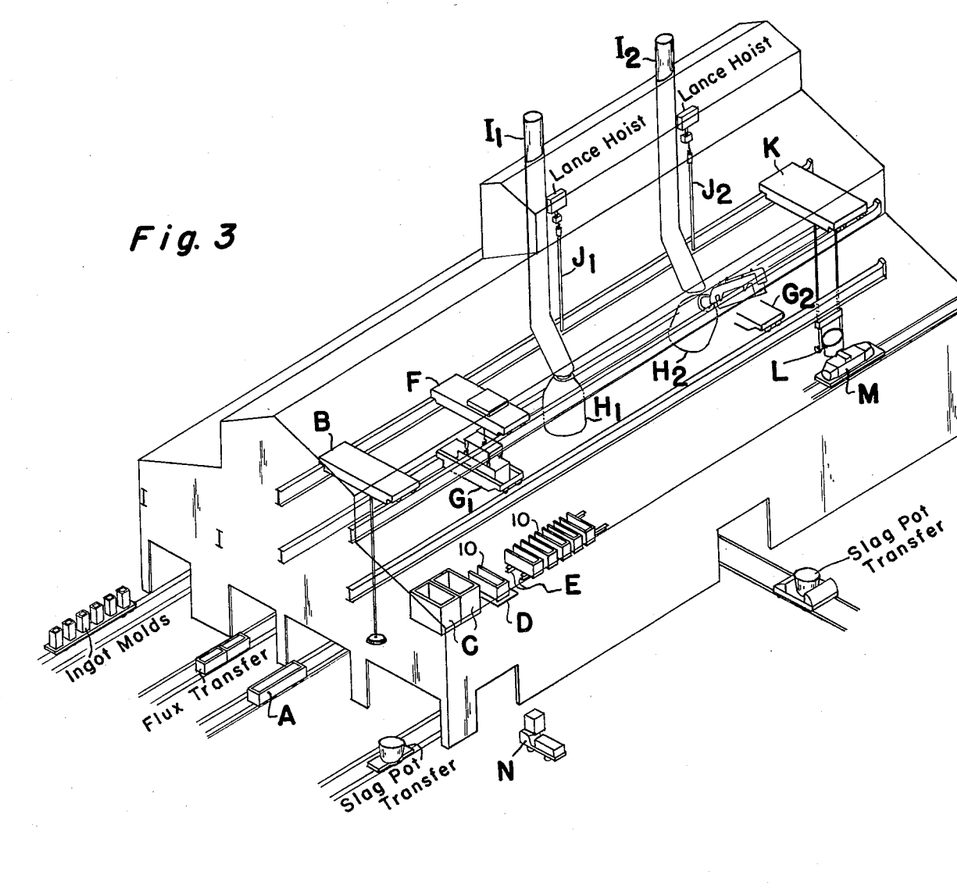
FIGURE 3 is an isometric view in elevation of the layout of FIGURES 1 and 2, but on a slightly smaller scale.

Referring particularly to FIGURES 1 to 3, inclusive, the plant layout shown includes a railway car A positioned on a track running longitudinally of the plant for bringing in scrap from outside sources, and somewhat diagrammatically represents a self-propelled motor-driven carrier, such as a Ross carrier, that may be provided with rubber tired wheels for movement along the floor area of the plant to provide for pick-up of in-plant available scrap to carry it in a straddled relationship transversely into a scrap collecting area of the plant. The scrap collecting area is represented particularly by storage bins C. A floor-mounted scale D is employed for weighing scrap in individual scrap boxes 10, as they are being filled, either directly from the units A or N or indirectly from the storage bins C, as by means of a magnet crane or hoist B.

It will be noted that the crane B is mounted on overhead rails for longitudinal movement in lifting scrap from the car A to the bin C and from the bin C to a scrap or metal charge receiving box or feed bin 10 that is being weighed on the scales D. The scrap box storage area has a longitudinal rail platform E for positioning filled and measured scrap boxes 10 in readiness for lifting to an overhead position in the plant. In this connection, an overhead crane or lifting hoist F which is carried on an overhead longitudinally-extending track runway that also carries the magnetic crane B, is employed for individually raising scrap boxes 10 to an overhead position with respect to vessels (such as $H_1$ and $H_2$ to be charged, and to lower each box into an operatively-carried position within a charging machine $G_1$ or $G_2$. The crane F is also employed to lift an empty scrap box 10 out of a charging machine to lower it to the scrap receiving station or area, for example on the scales D, in preparation for its refilling.

The scrap charging machines $G_1$ and $G_2$ are of a self-propelled type, as remotely controlled by an operator through flexible cable or electrical trolley connections to operate on an overhead longitudinal runway above the furnace vessels $H_1$ and $H_2$ and in front of the rails or runway which carry the magnetic crane B and the lift crane F.

In these figures, $I_1$ and $I_2$ represent effluent-collecting and discharging hood and duct assemblies for each of the furnace vessels $H_1$ and $H_2$. In FIGURE 3, the vessel $H_1$ is shown in an upright position with its mouth in alignment with the mouth of the assembly $I_2$ and ready to receive a lance $J_1$. Oxygen blow lances $J_1$ and $J_2$, mounted on hoists, are adapted to project through openings in the hood assemblies $I_1$ and $I_2$ and to project into the vessels $H_1$ and $H_2$ to refine metal therein. A charging crane K is also mounted on the same runway or rails as the cranes B and F and is adapted to suspend a molten metal charging ladle L therefrom to charge the vessels $H_1$ and $H_2$ with molten metal, independently of and in a coordinated manner with respect to the charging of scrap material. The ladle L may be supplied with molten metal by a transfer car M which is mounted on a longitudinal trackway on the floor level of the plant.

In FIGURES 1 and 2, the lance $J_1$ is shown in its lowered position with respect to the vessel $H_1$ for refining metal therein and, at the same time, a scrap charging machine $G_2$ is shown charging scrap into a second vessel $H_2$ which is mounted on the floor level of the plant in a longitudinally spaced-apart relation with the vessel $H_1$. At this time, the other scrap machine $G_1$ is carrying a filled scrap box in readiness for completing the charging supply of the vessel $H_2$ or for charging the vessel $H_1$. In FIGURE 3, the furnace vessel $H_2$ is being charged with scrap by means of the machine $G_2$ while the other scrap machine $G_1$ is receiving a charged scrap box from the overhead crane F in readiness, for example, for charging the vessel $H_1$.

Figure 4:
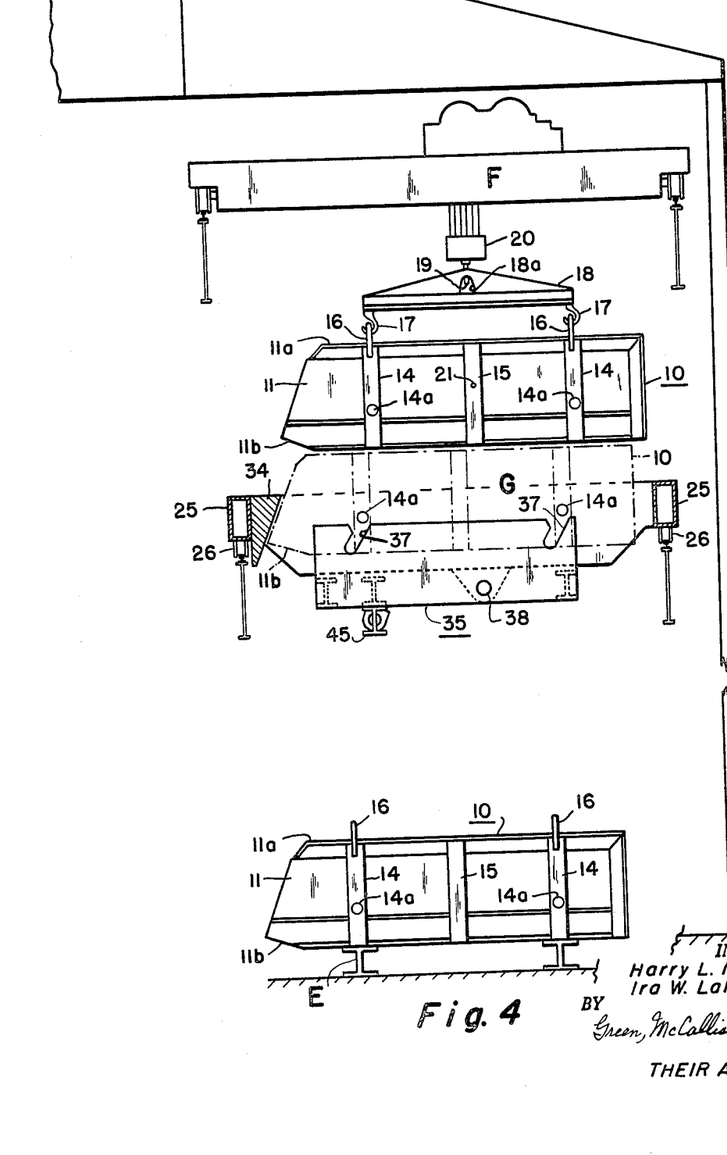
FIGURE 4 is an enlarged, partially fragmental end or transverse view in elevation through the plant layout of FIGURES 1 to 3, and particularly illustrating a scrap box at a "ready" station, an overhead scrap servicing or charging machine, and means for raising a filled scrap box in a horizontally-balanced relationship into an overhead position (see the full lines) and for lowering it into a carrying position within the machine (see the dot and dash lines)
Figure 5:
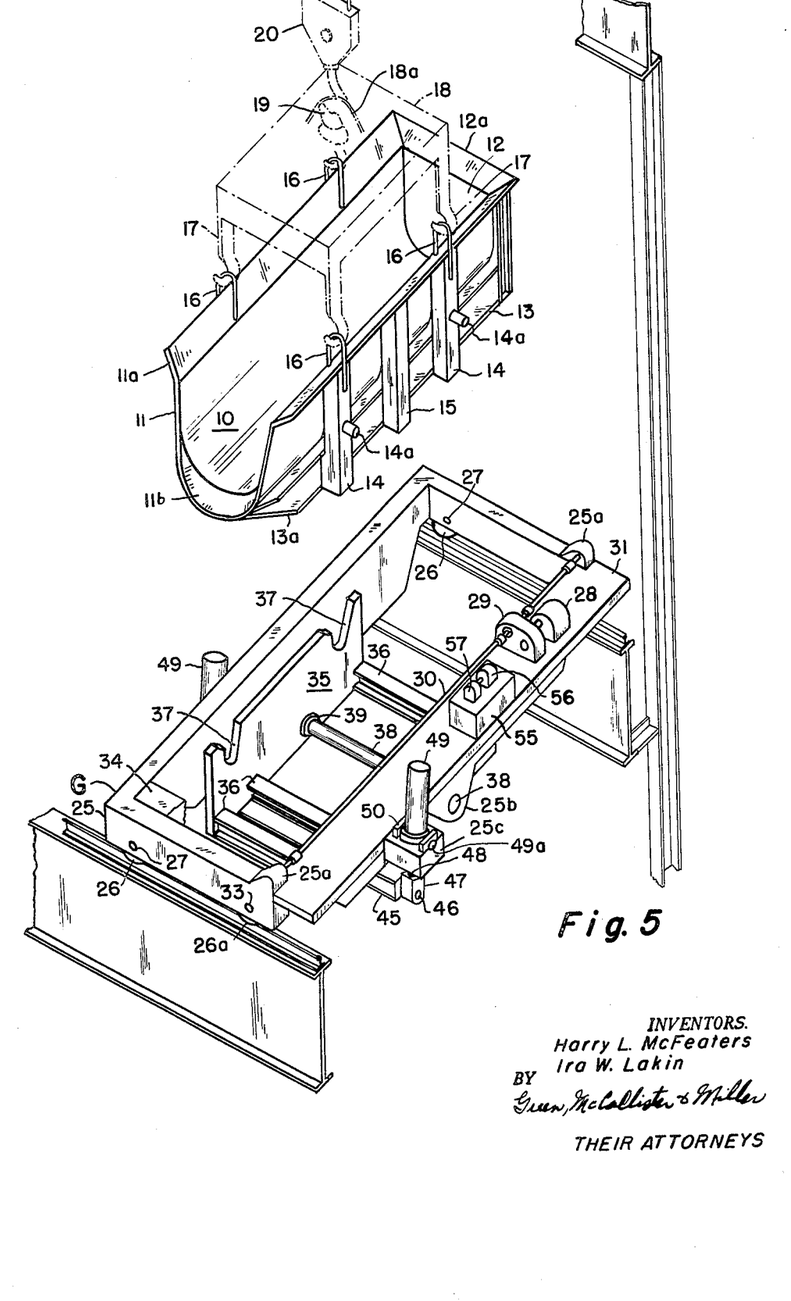
FIGURE 5 is an isometric view in elevation, on a slightly larger scale than FIGURE 4, illustrating details of the charging machine of such figure and of the construction of the scrap box used therewith, as well as of means for raising and lowering the scrap box in a balanced and non-tilting relationship from the lower "ready" station position of FIGURE 4 to an overhead position.
Figure 11:
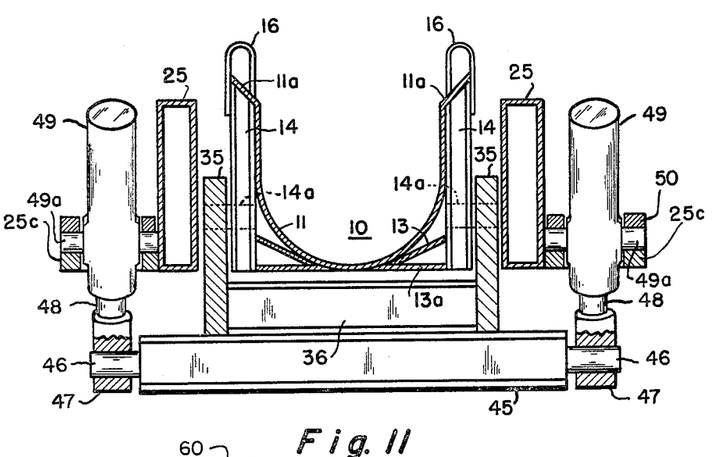
FIGURE 11 is an enlarged section on the scale of FIGURE 9, taken along the line XI—XI of FIGURE 8.

Referring particularly to FIGURES 4, 5, and 11, I have shown a scrap box 10 of an open-end delivery portion and of an open top construction whose wall 11 has a semi-circular-shaped bottom and substantially vertical sides and is closed at its back end by a vertical end wall 12. To facilitate the introduction of scrap into the box 10, the side walls 11 are provided with upwardly-outwardly diverging or sloped guide flanges 11a and the back wall 12 has a similar sloped flange 12a. The open front or delivery end portion of the wall 11 of the box 10 is sloped forwardly-downwardly and has, as shown particularly in FIGURES 4 and 5, an inwardly-downwardly declining guide delivery bottom end portion 11b, see also FIGURE 6. In the latter figure, when the box 10 is in its tilted position, it will be noted that the portion 11a projects beyond the lip edge of the tilted furnace $H_2$ to extend slightly therein and avoid spilling of the scrap material being charged.

As shown in FIGURE 4, the delivery end portion 11b is adapted to cooperate with an end closure 34 of a frame 25 of the scrap charging machine G, as are the inclined forward edges of the wall 11. In this connection, it will be noted that the closure member 34 is of a wedge or downwardly-forwardly sloped relationship to provide a complementary, fitting, sloped surface with respect to the forwardly-downwardly-inclined front edges of the wall 11.

The wall 11 is reinforced by an outer frame structure 13 to give it strength for carrying a heavy scrap load. This frame structure has a pair of bottom flanges 13a which extend substantially horizontally from opposite sides of the box 10 to enable the box to be positioned on rails, such as E of a "ready" station in the plant, without tilting or spilling a scrap charge. The frame structure 13 also includes a pair of longitudinally-spaced-apart upright posts 14 on each side of the box 10 which extend downwardly from underneath the flanges 11a and which carry side pairs of outwardly-projecting trunnions or support stud shafts 14a. Each side of the box 10 is also reinforced as to its frame structure by an intermediate upright post 15.

Figure 6:
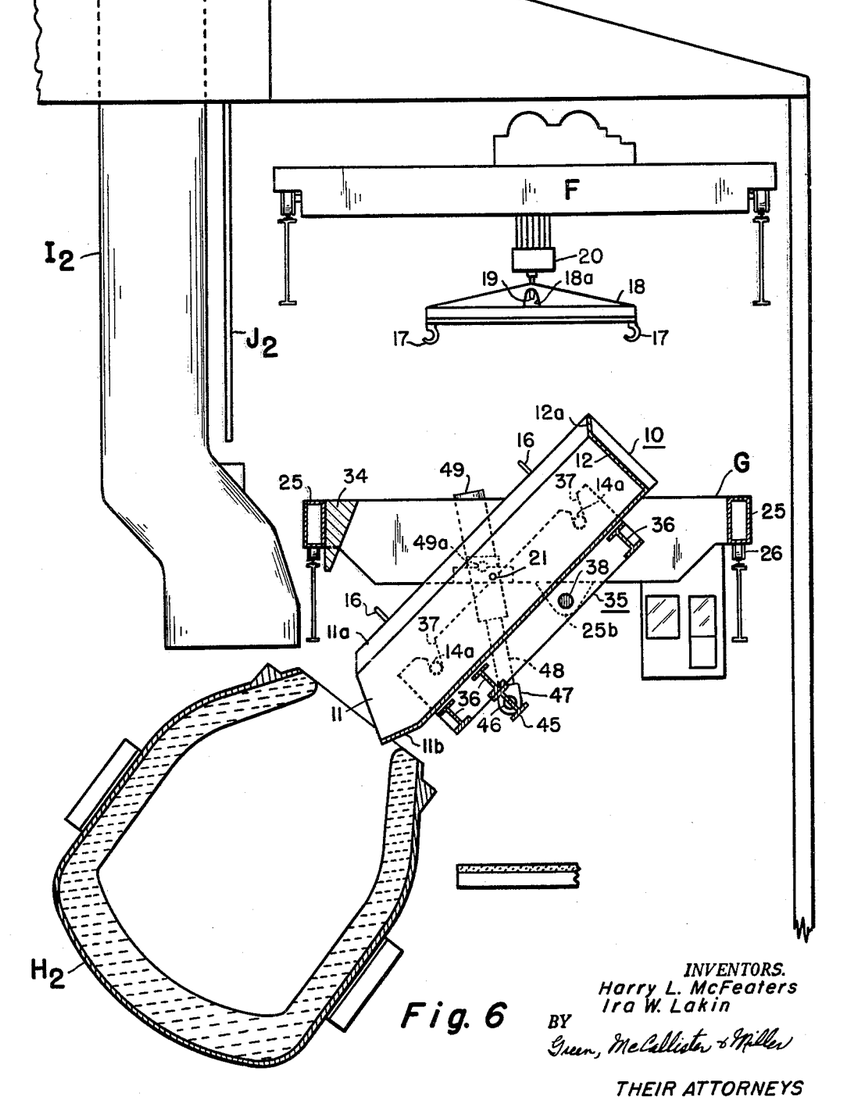
FIGURE 6 is an end or transverse view on the scale of FIGURE 4, particularly illustrating the employment of the charging or servicing machine in tilting a charging box and charging scrap material into an open mouth of a furnace vessel; this figure also illustrates means for raising the scrap box from its "ready" station, and the positioning of an effluent-receiving hood and oxygen-blow lance with respect to the vessel.
Figure 9:
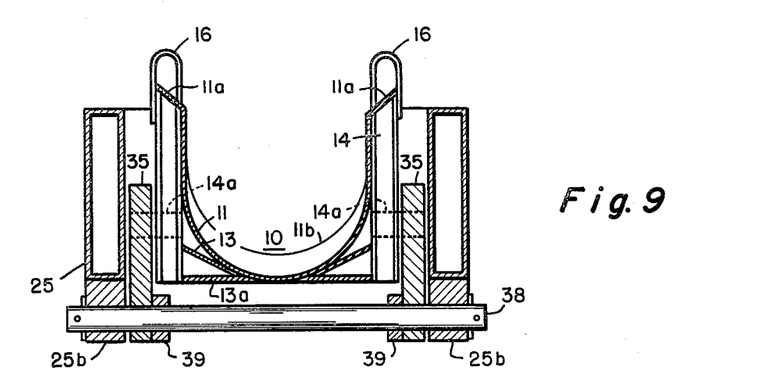
FIGURE 9 is an enlarged section in elevation taken along the line IX—IX of FIGURE 8.
Figure 10:
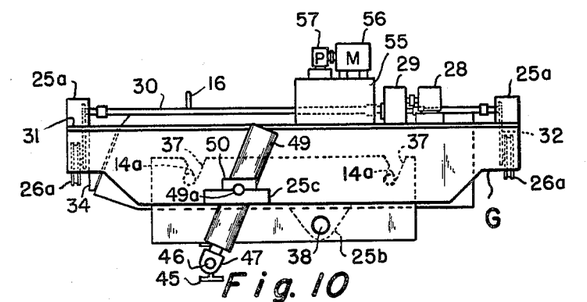
FIGURE 10 is a side view in elevation of the machine of FIGURE 7 and on the same scale as that FIGURE.

As shown particularly in FIGURES 4, 5 and 9, each post 14 has a U-shaped loop or hook eyelet 16 at its upper end that projects beyond the flanges 11a. A scrap box bail frame unit 18 has corner-mounted, side pairs of hooks 17 that are adapted to engage the eyelets 16, so that the box 10 will be supported in a horizontally balanced relation when it is being raised or lowered by the overhead crane F. As shown particularly in FIGURES 4 and 5, the crane F has a lift head 20 and a hook 19 that is adapted to engage within a central eyelet 18a of the bail frame unit 18. When a box 10 has been raised from the rails E of the "ready" station or area above a charging machine G, it is then adapted to be lowered into the machine, as shown in FIGURE 4. When the box is in position within the machine G, the hooks 17 of the bail 18 are disconnected from the eyelet 16, so that the box is fully carried at such time by the machine. Referring particularly to FIGURE 4, it will be noted that the center of gravity of the scrap box 10 when filled with scrap is located at 21. This is important from the standpoint of a balanced lifting and lowering of it into position within a cradle 35 of the machine G and also in connection with its tilting delivery of scrap, as shown in FIGURE 6.

The charging machine G, as shown particularly in FIGURE 5, has a longitudinally-elongated rectangular frame 25 which carries a pair of end housings 25a at opposite corners of its top along one side thereof, a pair of downwardly-projecting somewhat centrally-disposed side lugs 25b for journaling outer ends of a cradle swing trunnion or pivot shaft 38, and side mounts 25c which project therefrom (forwardly of the lugs 25b). The side mounts 25c each support a fluid or hydraulic motor 49 that is employed for tilting the cradle 35.

Figure 7:
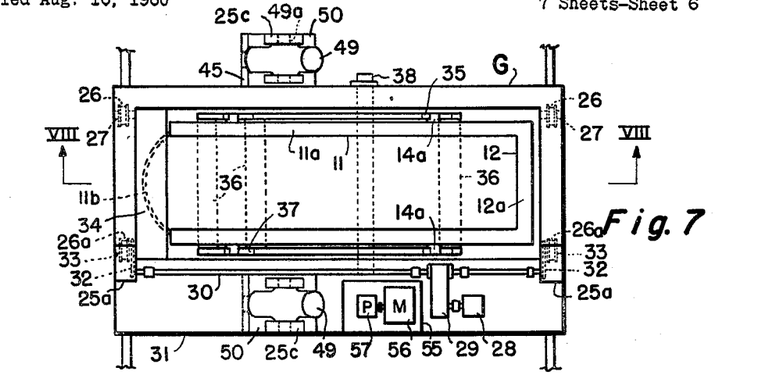
FIGURE 7 is a top plan view on the scale of FIGURE 6 of the charging or servicing machine of such figure and with a scrap box in position therein.
Figure 8:
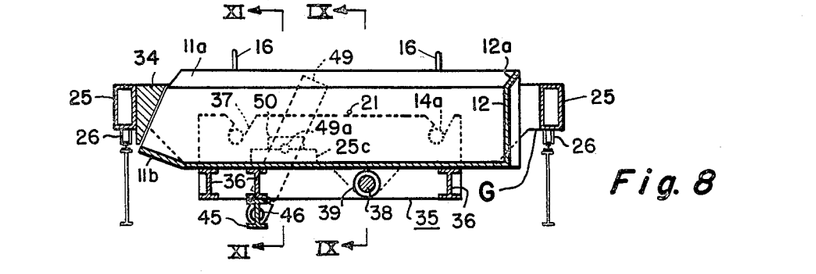
FIGURE 8 is a section on the scale of and taken along the line VIII—VIII of FIGURE 7, also showing a scrap box in position in the charging machine.

The frame 25 has a pair of flanged track wheels 26 journaled on stud shafts 27 for free movement along the track runway and a pair of driven flanged wheels 26a that are journaled at the opposite side of the frame. Stud shafts 33 are positive drive shafts for the driven wheels 26a. A reversible electric motor 28 is shown mounted on a side extension top platform 31 of the frame 25 and is operatively connected through a gear reduction unit 29 to actuate a drive shaft 30 which projects into the housings 25a and is geared to the shafts 33 through gear trains 32 (see FIGURE 7) to actuate the track wheels 26a. The motor may be controlled at a remote location in the plant by electrical connections thereto, such as flexible cables or a trolley.

The end closure 34 which projects from the inside of the front end of the frame 25 has a back closure face which declines forwardly-downwardly to, as previously mentioned, provide a complementary end closure for the scrap box 10 and which, at the same time, permits the scrap box to be tilted, for example, about 37 degrees from the vertical when the slope of such closure member is about 45 degrees from the vertical. The rectangular cradle frame 35, see particularly FIGURE 5, is open at its ends and at its top to receive the scrap box 10. Transverse rails 36 along the bottom of the box 34 are adapted to receive or position the bottom of the scrap box 10 and particularly, to cooperate with its substantially horizontal flanges 13a. The sides of the box 35 are slotted at 37 in a forwardly-downwardly-inclined manner for receiving the trunnions 14a of the scrap box 10. These side pairs of slotted guide portions 37 guide the scrap box 10 forwardly of the cradle 35 when the box is being lowered into position therein, and position its front end delivery portion in a closed-off relation with the closure means 34.

It will be noted that the scrap box 10 is supported at its bottom flanges 13a on the rails 36 as well as at its trunnions 14a on the closed bottoms of the slotted guide portions 37. A centrally-transversely-extending pivot or swing shaft 38 is carried by the lugs 25b of the frame 25 to extend from opposite sides of the cradle 35 and is rigidly secured to the cradle by collars 39. It will be noted that the position of the pivot shaft 38 is such that it is horizontally offset behind the center of gravity 21 of the scrap box 10, see FIGURE 4, when the scrap box is in position on the cradle 35.

The cradle 35 also carries an underpositioned, cross-extending, forwardly-mounted bar 45 which, at its opposite ends, carries shaft studs or swing trunnions 46. It will be noted that the bar 45 projects beneath the frame 25 as well as beneath the cradle 35 which is pivotally carried thereby. A piston head 47 is secured on each trunnion 46 and is actuated by a piston rod 48 of a fluid or hydraulic motor 49. The motor 49 is positive-acting, both in its forward and backward strokes, and may be of a conventional commercial type. As shown particularly in FIGURE 5, each motor 49 is supported on a side mount 25c by a trunnion block 50.

Figure 12:
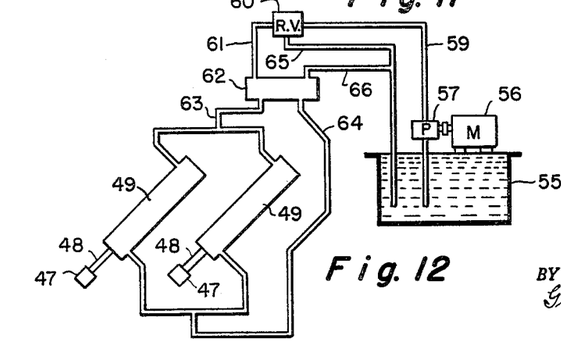
FIGURE 12 is a schematic layout of a fluid system for operating the tilting mechanism of the machine of FIGURE 11.

In FIGURE 12, I have shown a system suitable for operating the fluid motors 49. An oil tank 55 may (as shown in FIGURE 5) be mounted on the platform 31 for supplying hydraulic fluid. An electric motor 56 is shown carried on the top closure of the tank 55 and is adapted to drive a hydraulic pump 57. A supply line 59 extends from the tank 55 through the pump 57 to a relief valve 60. Two lines 61 and 65 extend from the relief valve, one being a return line to the tank 55 and being connected to a branch inlet line 66 of a 4-way control valve 62; 61 is connected to an opposite inlet side of the 4-way valve 62. A line 63 from one side of the control valve 62 is connected to an upper end of the cylinders of the hydraulic motors 49 to provide a positive flow of fluid to advance the piston rods 48 downwardly (as shown particularly in FIGURE 6) for tilting the cradle 35 and thus, the scrap box 10 to a furnace-charging position; for the return stroke of the rods 48, the line 63 serves as a fluid exhaust line. When scrap has been delivered to the furnace vessel, the valve 62 may then be operated to change line 64 from a fluid exhaust line to a positive fluid pressure line for supplying actuating force to the opposite ends of the motors 49. This, of course, causes the piston rods 48 to be moved inwardly to tilt the cradle 35 and its scrap box 10 upwardly from the position of FIGURE 6 to the substantially horizontal dot and dash position of FIGURE 4. The control valve may be remotely operated (as by an electric solenoid) by an operator to actuate the motors 49 to lower the cradle 35 and its scrap box 10 from a substantially horizontal to a forwardly-downwardly declining position to charge scrap to a furnace vessel and to then raise them back to their original positions.

It will be noted that the runway for the scrap charging machines G ($G_1$ and $G_2$) extends beyond the vessels $H_1$ and $H_2$ that are to be serviced and may be used for either or both of such vessels, without interference with the operation of the overhead hoist or crane units, such as B, F and K, which may operate on a common runway that is located above and behind the runway for the charging machines.

What we claim is:

1. A scrap charging installation for feeding scrap material downwardly from an overhead-aligned position into an open mouth portion of furnace vessels which comprises, a lower level scrap collecting, weighing and storage area; a group of scrap-material-receiving boxes in said area, means for filling said scrap boxes with measured quantities of scrap material, each of said scrap boxes having an end delivery portion for scrap material carried thereby, means in said area for positioning filled scrap boxes ready for individual lifting movement, a group of longitudinally-spaced-apart open-mouth furnace vessels operatively positioned longitudinally to one side of said area, an overhead runway extending longitudinally above and beyond opposite sides of the vessels, a pair of self-propelling charging machines operatively mounted for movement along said runway individually into and out of an overhead aligned position with each of the vessels, a tilt cradle carried by each of said machines to receive a filled scrap box therein, an overhead lifting means for engaging a ready-positioned filled scrap box and supporting it in a horizontally-level position while raising it above the vessels and lowering it into the tilt cradle of one of said machines, and means on each of said machines for tilting said cradle and a filled scrap box carried thereby to discharge scrap material from the end delivery portion of the scrap box into one of the vessels when the machine has been moved on said runway to an aligned position thereabove.

2. A scrap charging installation as defined in claim 1 wherein, a second overhead runway is positioned to extend longitudinally above the vessels and behind and above said first-mentioned runway, said overhead lifting means is operatively mounted for movement along said second runway, said means for filling said scrap boxes comprises a magnet hoist operatively positioned for movement along said second runway to fill the scrap boxes at said area, and said magnet hoist is operatively positioned for movement along said second runway independently of movement of said overhead lifting means along said second runway.

3. A scrap charging installation as defined in claim 2 wherein, a self-propelled metal-carrying ladle supporting hoist is operatively positioned on said second runway for movement therealong to move into alignment above each of the vessels for charging them with molten metal.

4. In a scrap charging assembly for feeding scrap material downwardly and directly into an open-mouth portion of a furnace vessel wherein, an overhead runway extends longitudinally above and beyond opposite sides of the vessel, and a self-propelling charging machine is operatively mounted for movement along said runway into and out of an aligned overhead position with respect to the vessel, an improved construction for charging the vessel which comprises, a cradle centrally-pivotally carried by said machine for swinging movement thereon from a normal substantially horizontal position, a scrap box having an open top portion for receiving scrap material therein and an open delivery end portion to deliver scrap material therefrom, said scrap box having means for positioning it within said cradle, said machine having means for closing-off the delivery end portion of said box when said box is positioned within said cradle and is in a normal substantially horizontal position with said cradle, and means for tilting said cradle and the scrap box carried thereby to swing the delivery end portion of said box downwardly out of a closed-off relationship with respect to said closing-off means into a scrap-delivering position with respect to the vessel.

5. In the scrap charging assembly defined in claim 4 wherein in the improved construction, said cradle has slotted guideways along its sides, and said scrap box has side trunnions adapted to engage within said guide slots and move forwardly therealong until its open delivery end portion is closed-off by said closing-off means.

6. In the scrap charging assembly defined in claim 5 wherein in the improved construction, a cross-shaft is carried by the machine and pivotally-positions said cradle, said cross-shaft is mounted backwardly of the center of gravity of said scrap box and from its delivery end portion, and said machine has means mounted forwardly of said shaft adjacent the delivery end portion of said scrap box for tilting said cradle between an upper substantially horizontal position and a forwardly-downwardly tilted position with respect to said machine.

7. In a scrap charging assembly for directly charging scrap material downwardly into an open mouth portion of a furnace vessel, an improved construction which comprises, a scrap box having a rounded bottom wall, substantially vertical side walls, a back end closure wall, and an open front end scrap-delivery portion, side pairs of trunnions projecting outwardly from said scrap box, a cradle of substantially rectangular shape having an open top portion to receive said scrap box therein, said cradle having pairs of guide slots along its sides that incline forwardly to receive said pairs of trunnions of said box when said box is lowered into position therewithin and to guide said box forwardly downwardly therewithin, a self-propelled charging machine having a fixedly-positioned substantially rectangular frame within which said cradle is operatively positioned, a swing shaft carried by and projecting transversely of said cradle and journaled within said machine, swing means carried by a forward end portion of said cradle adjacent the open front end portion of said scrap box, actuating means carried by said machine and operatively connected to said swing means to move said cradle and said scrap box carried thereby within said frame from a substantial horizontal position to a forwardly-downwardly inclined scrap-charging position.

8. In the scrap charging assembly defined in claim 7 wherein in the improved construction, said frame has an end closure member positioned transversely of its forward end to cooperate with the open front end of said scrap box and close it off when said scrap box is guided forwardly-downwardly within said cradle and said cradle is in a normal substantially horizontal position, and said end closure member has a positioning with respect to the open front end of said scrap box such that said scrap box may be freely tilted downwardly therefrom when said cradle is tilted downwardly to expose the open front end of said scrap box, so that the scrap material will flow therefrom when said scrap box is in a tilted relationship.

9. In the scrap charging assembly defined in claim 7 wherein in the improved construction, said scrap box has a forwardly-upwardly sloped bottom portion adjacent its open front end portion to fit within the open mouth portion of the vessel when said scrap box is swung to a forwardly-downwardly inclined scrap-charging position.

10. In the scrap charging assembly defined in claim 7 wherein in the improved construction, said actuating means comprises, a pair of fluid motors carried by said machine and operatively connected to opposite sides of said swing means, and means is carried by said machine for alternately actuating said fluid motors forwardly and backwardly to tilt said cradle downwardly and raise it upwardly to its horizontal position.

11. In a charging assembly for receiving and holding and for directly feeding metal charging material downwardly into an open-mouth refining furnace vessel wherein, an overhead runway extends longitudinally above and beyond opposite sides of the vessel, and a charging machine is operatively mounted for movement along the runway into and out of an overhead aligned position with respect to the vessel, an improved construction for charging the vessel comprising, means on the machine for moving it along the runway into and out of a transversely-aligned relation with respect to the open mouth of the vessel, a fixed-position frame carried by the machine and extending transversely of the vessel, a charging box having an open top portion for receiving metal material therein and having an open delivery end portion facing towards the vessel, means carried by said frame for securely positioning said charging box to extend transversely within said frame and for closing-off the open end portion of said box when it is in a normal substantially horizontal material-holding position within said frame, and means carried by said frame for swingably tilting said box forwardly-downwardly therewithin to uncover the open end portion of said box and into a forwardly-inclined feeding position with the open-mouth of the furnace when the machine is in substantial alignment therewith to feed the charging metal material out of the open end portion of said box into the open-mouth of the furnace.

12. In the charging assembly defined in claim 11 wherein the last-mentioned means of the improved construction comprises, pivot mounting means between said frame and said box, and means operatively connected between said frame and said box to positively retain said box in its substantially horizontal holding position, to swing said box downwardly into and retain it in its feeding position until the charging material therein is delivered to the furnace, and to then return said box empty to its substantially horizontal position.

13. In the charging assembly defined in claim 11 wherein the second-mentioned means of the improved construction has a cradle pivotally-swingably carried at one end substantially within the confines of said frame, and said cradle has guide-receiving means for said box for securely holding it in position therein, and wherein the last-mentioned means of the improved construction has swing means operatively connected between said frame and said cradle for swingably tilting said box between its substantially horizontal position and its forwardly-inclined feeding position.

14. In a charging assembly for receiving and holding and for directly feeding metal charging material downwardly into an open-mouth refining furnace vessel wherein, an overhead runway extends longitudinally above and beyond opposite sides of the vessel, and a charging machine is operatively mounted for movement along the runway into and out of a transversely-aligned overhead position with respect to the vessel, an improved construction for charging the vessel which comprises, a transverse frame fixedly-carried by the machine and having an open central portion therein, a charging box having an open top portion for receiving the metal charging material therein and a forward open-end delivery portion to deliver the material therefrom, said frame having means securely positioning said box therewithin to extend transversely thereof with its open mouth portion projecting towards the vessel and for normally retaining said box in a substantially horizontal holding position within said frame, closure means carried by said frame for closing-off the open-end portion of said box when said box is in its substantially horizontal position, and means for swinging said box downwardly from its substantially horizontal position within said frame into a forwardly-inclined feeding position with respect to the open-mouth vessel when the machine is in transverse alignment with the vessel and for returning said box to its horizontal position when charging material has been delivered therefrom into the vessel, and said closure means having a forwardly-downwardly sloped guide face along which the open-end portion of said box moves to uncover the open-end portion when said box is swung downwardly from its substantially horizontal position.

15. In the charging assembly defined in claim 14, wherein, said frame of the improved construction has a cradle therein for guidably receiving said box therewithin, and said cradle is tilted with said box within said frame when said box is moved between its substantially horizontal and its forwardly inclined positions, and said box of the improved construction has means for moving it into and out of a receiving position within said cradle.

16. A scrap handling and charging installation for selectively feeding scrap material downwardly from an overhead-aligned position into an open-mouth portion of furnace vessels which comprises, a lower level scrap collecting, weighing, and storage area; a group of scrap-material-receiving boxes in said area, each of said scrap boxes having an end delivery portion for scrap material carried thereby, means for filling said scrap boxes with measured quantities of scrap material in said area, means in said area for positioning filled scrap boxes ready for individual lifting movement, at least one open-mouth furnace vessel operatively positioned longitudinally to one side of said area, a first overhead runway extending longitudinally above and beyond opposite sides of the vessel, a pair of self-propelled charging machines operatively mounted for selectively coordinated movement along said first runway individually into and out of an overhead aligned position with the vessel, a tilt cradle carried by each of said machines to receive a filled scrap box therein, a second overhead runway extending longitudinally above and along said first runway; an overhead lifting means operatively mounted on said second runway to engage a ready-positioned filled scrap box for supporting it in a horizontally-level position while raising it above the vessel, moving the filled scrap box selectively into overhead alignment with one of said machines, and lowering the filled scrap box into the tilt cradle of the selected machine; and means on each of said machines for tilting said cradle and a filled scrap box carried thereby to discharge the scrap material from the end delivery portion of the scrap box into the vessel when one machine has been selectively moved on said first runway to an overhead-aligned position above the vessel.

17. An installation as defined in claim 16 wherein, an overhead magnetic hoist is operatively mounted on said second runway for coordinated movement therealong with respect to said overhead lifting means for moving scrap material into and for filling scrap boxes in said area.

References Cited in the file of this patent
UNITED STATES PATENTS

| | | |
|---|---|---|
| 2,061,563 | Chambers et al. | Nov. 24, 1936 |
| 2,792,602 | Rossi | May 21, 1957 |
| 2,836,309 | McFeaters | May 27, 1958 |